United States Patent
Galbaransingh et al.

(10) Patent No.: US 12,481,605 B2
(45) Date of Patent: Nov. 25, 2025

(54) SHARING STATE INFORMATION USING SHARED MEMORY

(71) Applicant: Arista Networks, Inc., Santa Clara, CA (US)

(72) Inventors: Vijay Varma Galbaransingh, Vancouver (CA); Christopher Elisha Neilson, Coquitlam (CA); Sebastian Sapa, Vancouver (CA); Duncan Stuart Ritchie, Bowen Island (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 67 days.

(21) Appl. No.: 18/615,659

(22) Filed: Mar. 25, 2024

(65) Prior Publication Data

US 2025/0298757 A1    Sep. 25, 2025

(51) Int. Cl.
 *G06F 13/16*       (2006.01)
(52) U.S. Cl.
 CPC ...... *G06F 13/1663* (2013.01); *G06F 13/1621* (2013.01); *G06F 13/1642* (2013.01)

(58) Field of Classification Search
 None
 See application file for complete search history.

(56) References Cited

U.S. PATENT DOCUMENTS

2022/0164300 A1* 5/2022 Wu ............... G06F 12/0238

* cited by examiner

*Primary Examiner* — Charles J Choi
(74) *Attorney, Agent, or Firm* — Fountainhead Law Group, PC

(57) ABSTRACT

The present disclosure is directed to a shared first-in-first-out (FIFO) queue architecture in a computing device, such as a network device, that allows lock-free, concurrent access to a writer process (writer) and one or more reader processes (readers). The writer enqueues information provided to the computing device. One or more readers dequeue the information and process the information. A queue manager provides an interface to the shared queue to allow the writer to push data onto the queue and readers to access the queue; e.g., peek and pop the queue. The readers inform the writer when they perform dequeue operations so that the writer knows when to age out queue entries for deletion from the queue.

20 Claims, 12 Drawing Sheets

SHARING STATE INFORMATION USING SHARED MEMORY

CROSS REFERENCE TO RELATED APPLICATIONS

This application is related to Applicant's U.S. Pat. Nos. 9,367,251 and 9,996,263, the content of both of which are incorporated herein by reference in their entirety for all purposes.

BACKGROUND

The present disclosure relates to shared memory where independently running processes can write to and read from the shared memory. The disclosure further relates to a first-in-first-out (FIFO) data structure, also known as queue, where the first element added to the queue is the first one to be removed.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
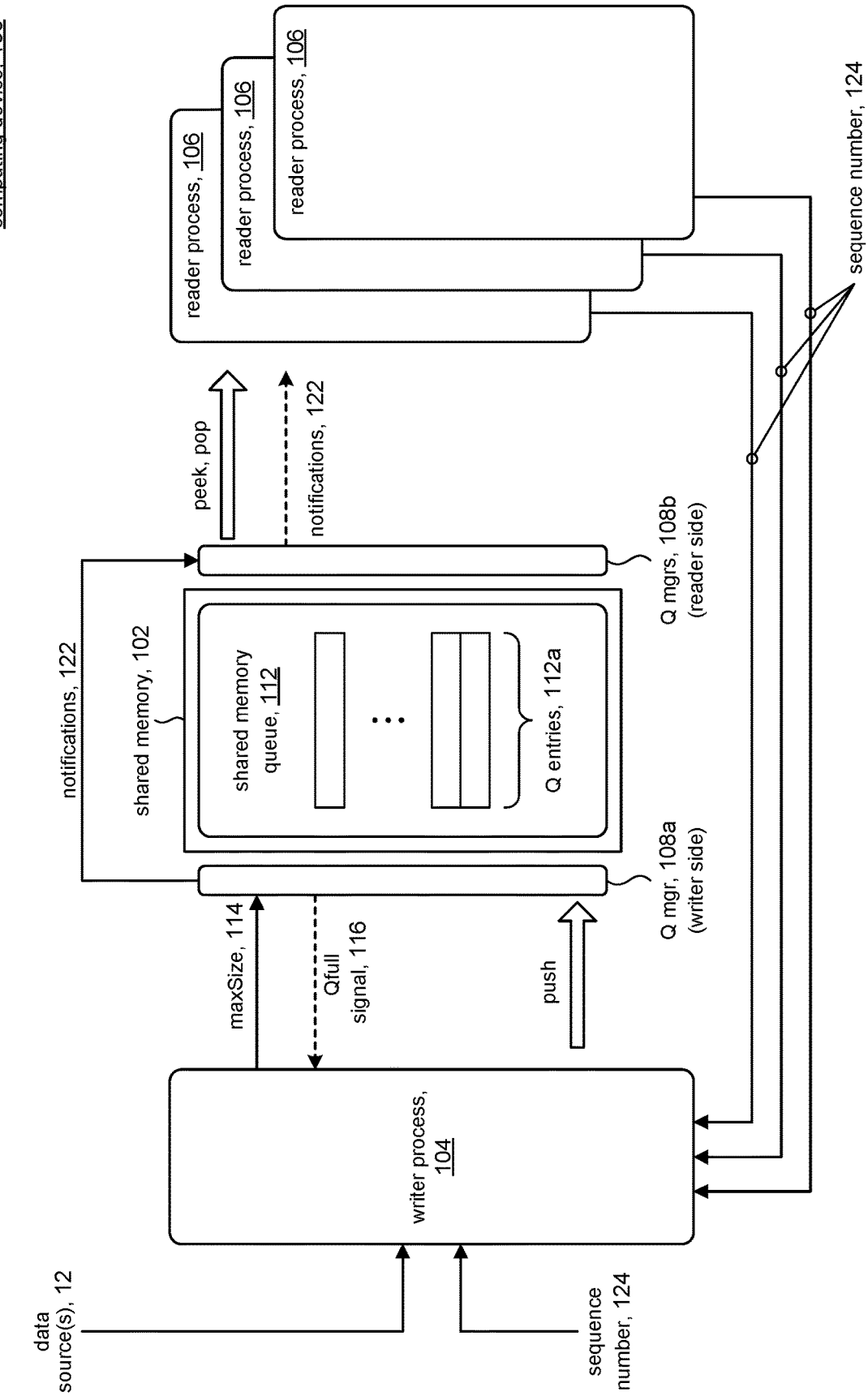
FIG. 1 is a high level representation of a shared memory architecture in accordance with the present disclosure.

The present disclosure is directed to a shared memory based first-in-first-out (FIFO) queue architecture that allows lock-free, concurrent access to a writer process (writer) and one or more reader processes (readers). The writer manages aging queue entries in response to readers dequeuing entries from the queue. This allows the writer to know when it can age out old queue entries.

The present disclosure is generally applicable in any computing device where the order of information processing is important and where consumer (reader) based aging of that information is desired as opposed to policy based aging by the producer (writer). In a network device, for example, the order in which routes are programmed in its hardware tables is important because the order can affect the flow of traffic through a network.

In various embodiments of a network device in accordance with the present disclosure, a writer process runs in the control plane and enqueues routing information provided to the network device. One or more reader processes running in the data plane dequeue the routing information, process the routing information, and program hardware tables in the data plane. A queue manager provides an interface to the shared queue to allow the writer to enqueue data onto the queue and readers to access the queue; e.g., peek and pop the queue. In accordance with the present disclosure, the readers can communicate with the writer to influence ageing out of queue entries.

The overall flow goes as follows:

When the writer receives a data object, the writer pushes an entry containing the data object on the queue. The pushed entry includes a monotonically increasing sequence number which serves to uniquely identify each queue entry to the writer and the readers.

The writer notifies the readers that it pushed a data object.

A reader can "peek" the queue which means that the reader can simply read the head of the queue without advancing the front of the queue to the next entry. The reader can "pop" the queue which reads the top of the queue and advances the front of the queue to the next entry. Each reader maintains its own pointer to the queue that represents its own view of where the front of the queue is.

Each time a reader does a pop, it can update the writer with the sequence number of the popped queue entry. The sequence number informs the writer how far the reader is in the queue. The writer uses this information from all the readers to know how much of the queue can be aged out, so that those queue entries can be subsequently deleted (pruned). In some embodiments, the writer can age out only those entries that have been popped by every reader; i.e., the writer can age out entries up to the smallest sequence number received from all readers.

Additional aspects of the present disclosure in accordance with some embodiments:

The state of the queue is persistent, including for example the queue itself and the writer state such as most recent sequence number and maximum queue size. In some embodiments, reader state can be persisted, such as the reader's front of the queue pointer, the reader's last consumed sequence number, etc. This state information persists across process (writer, reader, queue manager) restarts.

In various embodiments, each reader can choose to be notified when an entry has been pushed by the writer; e.g., after each push, periodically, only if it has read all previous entries, etc.

As a practical matter, readers may send the sequence number update to the writer on a periodic basis to avoid flooding the writer with too many updates. The sequence number update informs the writer of the last sequence number consumed by a given reader.

The writer can push data objects on the queue independently of when a reader peeks or pops the queue. In some embodiments, a maxSize parameter can limit how far the writer can get ahead of the reader. The maxSize parameter limits the number of pending queue entries. For example, a maxSize of four implies the queue can have at most four pending entries. If the maxSize parameter is not set, the queue can be unlimited.

The reader can request the writer to set a maxSize value. In the case of multiple readers, the writer can use the smallest maxSize value. In some cases, the writer can compute an average value and use that as the maxSize value.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a high level diagram illustrating a computing device 100 that can embody the techniques in accordance with the present disclosure. The computing device 100 can include a shared memory 102 component. The shared memory 102 can be any suitable memory such as dynamic random access memory (DRAM). The memory 102 is shared in that a writer process 104 and one or more reader processes 106 can concurrently access the memory. It will be appreciated that in some embodiments, the writer and reader processes may instead be separate threads of execution (such as POSIX threads) within the same program instance, rather than completely separate executing program instances (such as POSIX processes). As such, "processes" as used herein will be understood to include separate executing program instances or separate threads of execution within a given program instance.

The computing device 100 can instantiate a writer-side queue manager 108a to create and manage a queue 112 in the shared memory 102. The writer-side queue manager 108a can push data onto the queue. The computing device 100 can instantiate reader-side queue managers 108b to read (peek, pop) queue entries from the queue 112. In some embodiments, a reader-side queue manager 108b can be instantiated for each reader process 106.

The computing device 100 can instantiate a writer process 104 to enqueue (push) data onto the queue 112 in accordance with the present disclosure. In some embodiments, for example, the writer process 104 can receive data objects from one or more sources 12 and push the data object onto the queue 112, where each data object is stored in a queue entry 112a. In accordance with the present disclosure, the size of the data object in a queue entry 112a can vary from one entry to the next; e.g., one queue entry may store 10 bytes of data, the next queue entry may store 1024 bytes of data, and so on. In some embodiments, the writer process 104 can specify a maximum size parameter (maxSize) 114 to limit the number of pending queue entries 112a in the queue 112. The queue manager 108a can send a queue-full signal 116 to the writer process 104 in response to an attempt to push data onto a full queue. The queue-full signal 116 can serve to signal the writer process 104 that the queue 112 is full.

The maxSize parameter 114 can be specified by any suitable manner. In some embodiments, for example, the maxSize parameter 114 can be a fixed system parameter. In some embodiments, the maxSize parameter can be manually set by a user. In other embodiments, the writer process 104 itself can set the maxSize parameter. The writer process can vary the value of the maxSize parameter 114 over time as its load conditions vary. In some embodiments, the reader processes 106 can communicate respective maxSize parameters to the writer process 104. The writer process 104 can use the largest (or smallest) maxSize value as the maxSize, or compute an average value as the maxSize, and so on.

The computing device 100 can instantiate one or more reader processes 106 to read data (peek, pop/dequeue) from the queue 112 in accordance with the present disclosure. In some embodiments, when the writer process 104 pushes data onto the queue 112, the writer-side queue manager 108a can send a notification 122 to each reader-side queue manager 108b to notify the corresponding reader process 106 that data has been pushed onto the queue. The reader process 106 need not read the queue 112 in response to the notification but rather is simply notified that data has been enqueued. Any suitable interprocess communication or signaling mechanism can be used to communicate the notification 122 from the writer-side queue manager 108a 104 to the reader-side queue managers 108b.

In accordance with some embodiments of the present disclosure, the writer process 104 can include a sequence number 124 that is incremented (monotonically increasing) with each data object that is pushed onto the queue 112. In accordance with the present disclosure, each reader process 106 can report or otherwise communicate to the writer process 104 the sequence number 124 associated with a popped (dequeued) queue entry; e.g., using a suitable interprocess communication mechanism.

The present disclosure is generally applicable in any computing device where the order of information processing is important and where consumer (reader) based aging of that information is desired as opposed to policy based aging by the producer (writer). In a network device, for example, the order in which routes are programmed in its hardware tables affects the flow of traffic through a network. For discussion purposes, the present disclosure will describe embodiments in the context of a network device.

Figure 2:
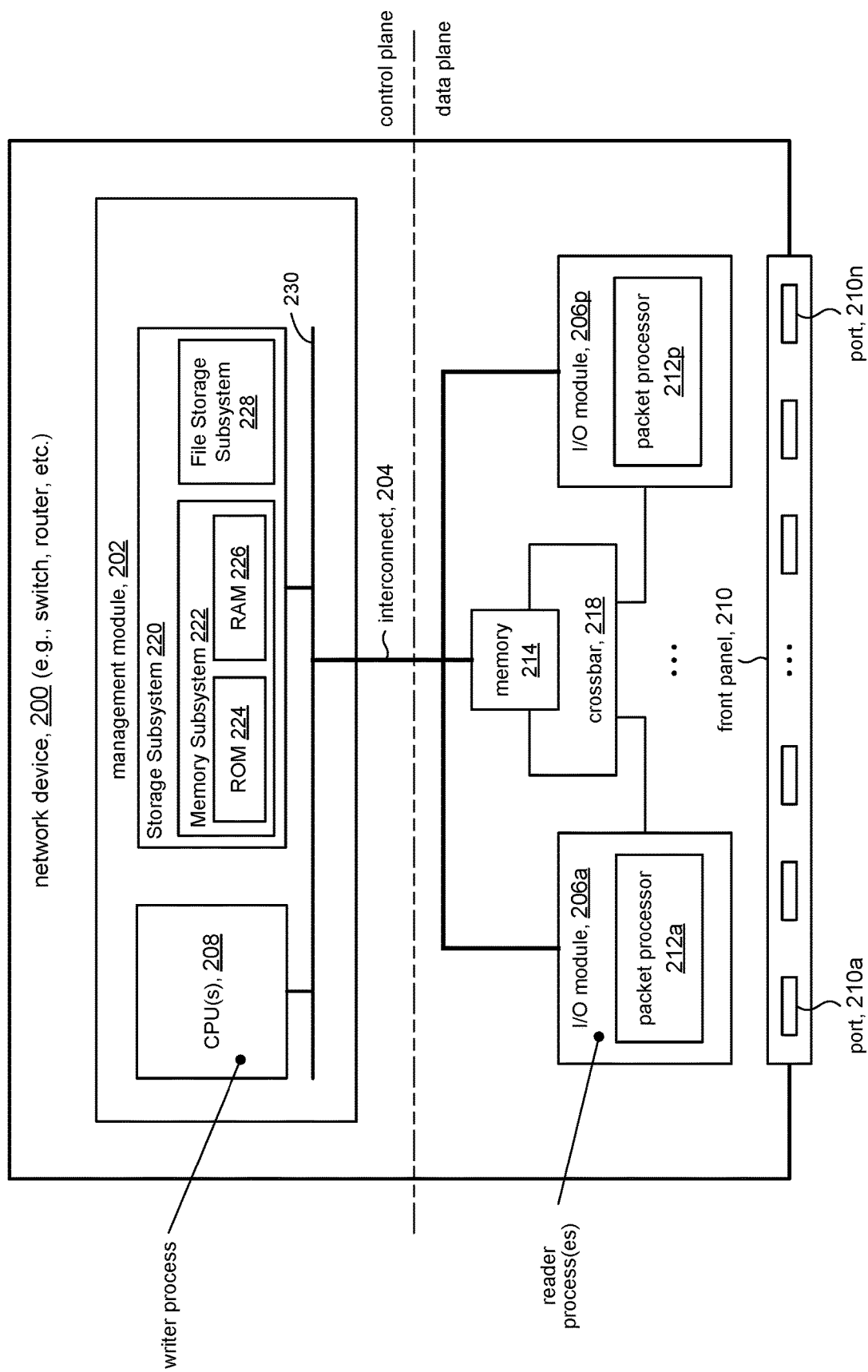
FIG. 2 is a block diagram representation of a network device, as an illustrative example of a computing device, in accordance with the present disclosure.

Although the remaining disclosure describes embodiments in the context of a network device, it will be appreciated that the present disclosure can be embodied in any computing device where the order of information processing is important and where consumer (reader) based aging of that information is desired rather than a policy based aging by the producer (writer). For example, embodiments in accordance with the present disclosure can be applied in the context of transaction logging systems, such as:
  database management systems
  distributed message/event logs
  gaming engine, where user input is the producer (writer) and the engine is the consumer (reader) of the input FIG. 2 is a schematic representation of a network device 200 (e.g., a router, switch, firewall, and the like) to serve as an illustrative example of a computing device that can be adapted in accordance with the present disclosure. In some embodiments, for example, network device 200 can include a management module 202, one or more I/O modules (switches, switch chips) 206a-206p, and a front panel 210 of I/O ports (physical interfaces, I/Fs) 210a-210n. Management module 202 can constitute the control plane of network device 200 (also referred to as the control layer or simply the central processing unit, CPU), and can include one or more CPUs 208 for managing and controlling operation of network device 200 in accordance with the present disclosure. Each CPU 208 can be a general-purpose processor, such as an Intel®/AMD® x86, ARM® microprocessor and the like, that operates under the control of software stored in a memory device/chips such as read-only memory (ROM) 224 or random-access memory (RAM) 226. The control plane provides services that include traffic management functions such as routing, security, load balancing, analysis, and the like.

The one or more CPUs 208 can communicate with storage subsystem 220 via bus subsystem 230. Other subsystems, such as a network interface subsystem (not shown in FIG. 2), may be on bus subsystem 230. Storage subsystem 220 can include memory subsystem 222 and file/disk storage subsystem 228. Memory subsystem 222 and file/disk storage subsystem 228 represent examples of non-transitory computer-readable storage devices that can store program code and/or data, which when executed by one or more CPUs 208, can cause one or more CPUs 208 to perform operations in accordance with embodiments of the present disclosure.

Memory subsystem 222 can include a number of memories such as main RAM 226 (e.g., static RAM, dynamic RAM, etc.) for storage of instructions and data during program execution, and ROM (read-only memory) 224 on which fixed instructions and data can be stored. File storage subsystem 228 can provide persistent (i.e., non-volatile) storage for program and data files, and can include storage technologies such as solid-state drive and/or other types of storage media known in the art.

CPUs 208 can run a network operating system stored in storage subsystem 220. A network operating system is a specialized operating system for network device 200. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 230 can provide a mechanism for the various components and subsystems of management module 202 to communicate with each other as intended. Although bus subsystem 230 is shown schematically as a single bus, alternative embodiments of the bus subsystem can utilize multiple buses.

The one or more I/O modules 206a-206p can be collectively referred to as the data plane of network device 200 (also referred to as the data layer, forwarding plane, etc.). Interconnect 204 represents interconnections between modules in the control plane and modules in the data plane. Interconnect 204 can be any suitable bus architecture such as Peripheral Component Interconnect Express (PCIe), System Management Bus (SMBus), Inter-Integrated Circuit (I²C), etc.

I/O modules (switch cards) 206a-206p can include respective packet processing hardware comprising packet processors 212a-212p (collectively 212) to provide packet processing and forwarding capability. Each I/O module 206a-206p can be further configured to communicate over one or more ports 210a-210n on the front panel 210 to receive and forward network traffic. Packet processors 212 can comprise hardware (circuitry), including for example, data processing hardware such as an application specific integrated circuit (ASIC), field programmable gate array (FPGA), processing unit, and the like, which can be configured to operate in accordance with the present disclosure. Packet processors 212 can include forwarding lookup hardware (hardware tables) such as, for example, but not limited to content addressable memory such as ternary CAMs (TCAMs) and auxiliary memory such as static RAM (SRAM).

Memory hardware 214 can include buffers used for queueing packets. I/O modules 206a-206p can access memory hardware 214 via crossbar 218. It is noted that in other embodiments, the memory hardware 214 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

In accordance with some embodiments of the present disclosure, a writer process can run in the control plane of the network device. One or more reader processes can run in each I/O module 206 in the data plane of the network device. Memory hardware 214 can include shared memory (e.g., 102, FIG. 1) that can be accessed by the writer process 104 and reader processes 106 running in the I/O modules 206. The writer process 104 can enqueue information such as routes, forwarding rules, etc. to be programmed in hardware tables of the packet processors 212.

Figure 3:
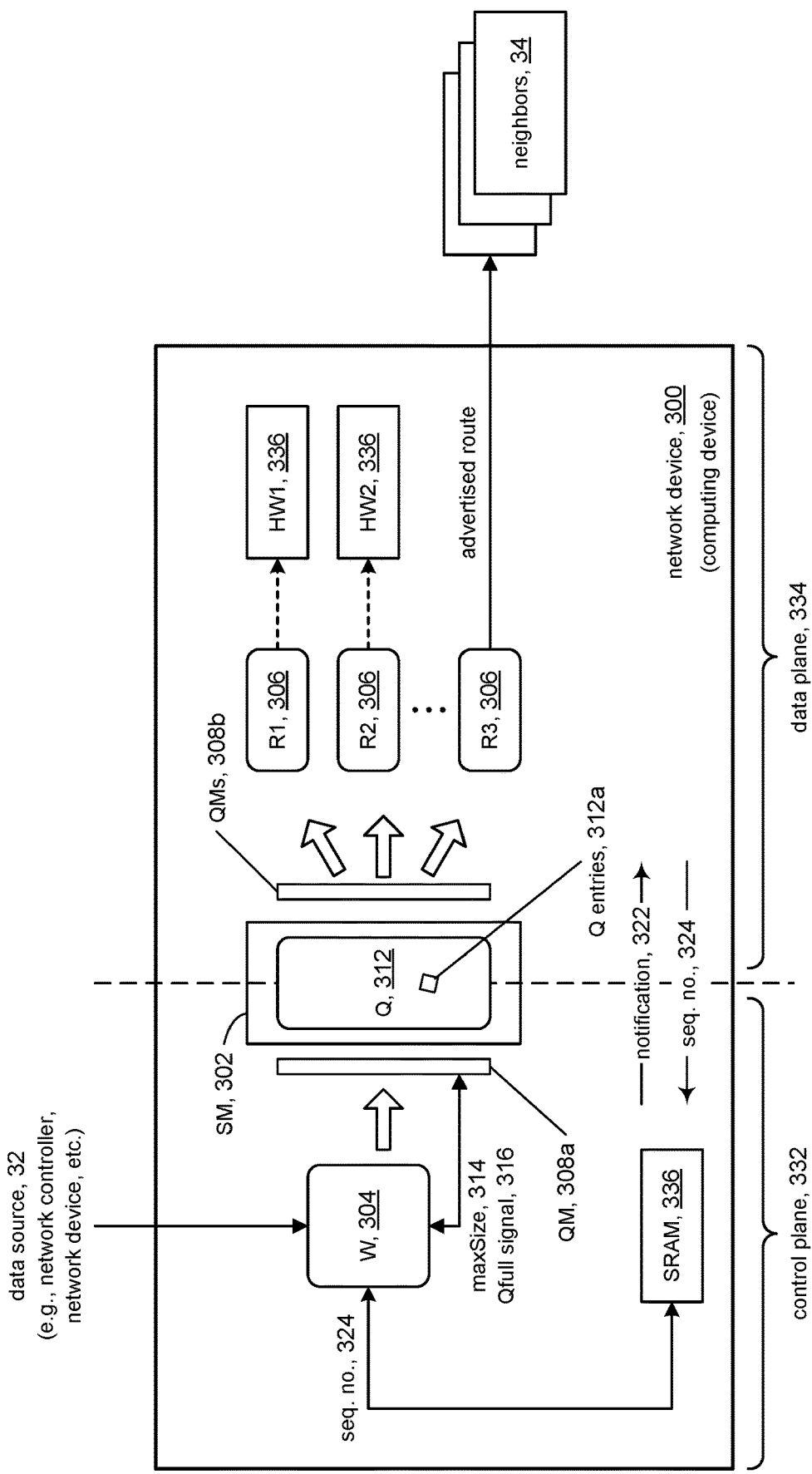
FIG. 3 is high level representation of a shared memory architecture in accordance with the present disclosure in the context of a network device.

FIG. 3 is a block diagram representation of an illustrative embodiment of a network device 300 in accordance with the present disclosure. The network device 300 includes a shared memory device 302 such as DRAM. The writer process 304 and writer-side queue manager 308a can be processes that run in the control plane 332 of the network device. One or more reader processes 306 and corresponding reader-side queue managers 308b can run in the data plane 334 of the network device. The queue manager 308a can instantiate a shared queue 312 in the shared memory 302 and manage that queue.

The writer process 304 can send networking information to the reader processes 306, such as routes, forwarding rules, etc. via the shared queue 312. The writer process 304 can receive networking information from an external data source 32. For example, the writer process 304 can receive routes from a central network controller, the routes can be advertised by another network device, and so on. The writer process 304 can enqueue the received data on the queue 312 for consumption by the reader processes 306. Each reader process 306 can read (peek, pop/dequeue) queue entries 312a from the queue 312 via its corresponding queue manager 308b and perform appropriate processing. Merely to illustrate, for example, reader process R1 can read a queue entry from the queue and process the data contained in the entry. The processing may include programming a route in a hardware table 336 such as a routing table, programming a forwarding rule in a forwarding information base, etc. Another reader process R3 may advertise a route to its neighbors 34 instead of programming the route, and so on.

A suitable interprocess communication mechanism can be provided to allow messaging between the control plane and the data plane. For example, the queue manager 308a in control plane 332 can send notifications 322 to the one or more queue managers 308b running in the data plane 334. Conversely, the reader processes 306 can send their respective sequence numbers 324 to the writer process 304.

The network device 300 can include a suitable static memory 336 such as an SRAM. In some embodiments, state information for the writer process 304 and the queue manager 308a can be stored in SRAM 336. The state information can be updated with each state change. If the writer process 304 or queue manager process 308a restarts from a crash, the process can reinitialize to the last state just before the crash. State information includes the queue 312, the sequence number 324, the maxSize parameter 314, and other state used by the writer and queue manager processes. In some embodiments, the reader processes 306 may or may not maintain their own state, depending on the particular requirements of a given reader.

Figure 4:
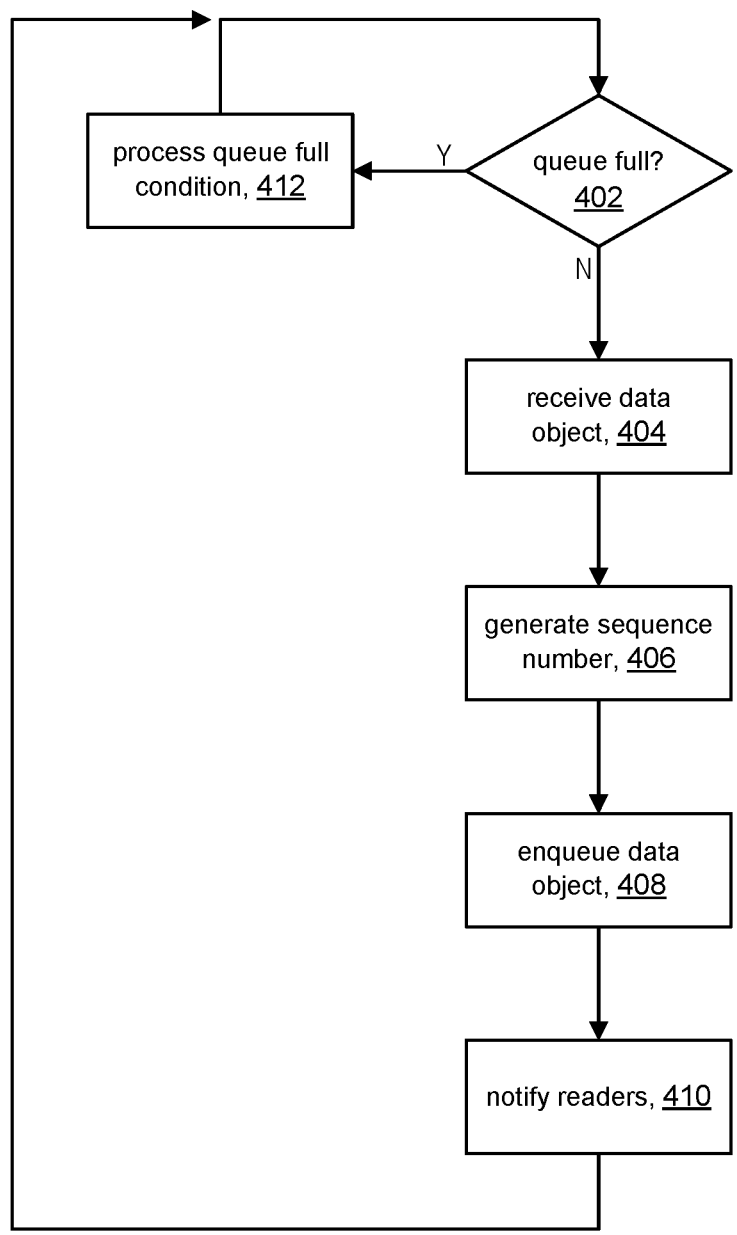
FIG. 4 is representative flow of operations in a writer process in accordance with the present disclosure.

Referring to FIGS. 3 and 4, the discussion will now turn to a high-level description of processing in a computing device for enqueueing data on a shared memory queue (e.g., 112, 312) in accordance with the present disclosure. For discussion purposes, the illustrative example for a computing device is a network device, such as illustrated in FIG. 3. Processing in the network device is divided between the control plane (writer-side queue manager, writer process) and the data plane (reader processes and corresponding read-side queue managers). The network device can include one or more processing units (circuits), which when operated, can cause the network device to perform processing in accordance with FIG. 4. Processing units (circuits) in the control plane, for example, can include general CPUs that operate by way of executing computer program code stored on a non-volatile computer readable storage medium (e.g., read-only memory); e.g., CPU 208 in the control plane (FIG. 2) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 212a-212p in the data plane (FIG. 2) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At decision point 402, if the queue is not full, then processing can proceed to operation 404. If, on the other hand, the queue is full, then processing can continue to operation 412 to handle a queue-full condition. As noted above, the maxSize parameter can specify a maximum number of pending entries in the queue. A pending entry is an entry that has not been dequeued. In accordance with some embodiments of the present disclosure, an entry can also be deemed "pending" even though it has been dequeued. This aspect of the present disclosure is discussed in more detail below. In the network device use case, the queue-full signal 316 from the queue manager 308a can indicate to the writer process 304 that the queue 312 is full (queue-full condition). In response to a queue-full condition, the writer process 304 can simply do nothing. In other embodiments, the writer process 304 can take appropriate action at operation 412. The particular actions performed for a queue-full condition can vary from one embodiment to another; e.g., the writer process can enter a busy/wait state. Processing can return to decision point 400, and the loop can continue until the queue is not full.

At operation 404, a writer process running on the computing device can receive a data object from a data source. In accordance with the present disclosure, the data object can vary in size (e.g., number of bytes) from one data object to the next. In the network device use case, the writer process 304 can receive network information from another network device, a central network controller, etc. The network information can be routes, forwarding rules, etc. that can be programmed into hardware tables in the network device and/or advertised to other network devices.

At operation 406, the writer process can generate a sequence number. In accordance with the present disclosure, the sequence number serves to uniquely identify each entry that is enqueued. In some embodiments, for example, the sequence number can be an integer that is incremented with each successive entry; in other words, the sequence number can be a monotonically increasing quantity. In the network device use case, the sequence number 324 can be persisted in SRAM 336 so as to maintain its latest value. The writer process 304 can read the sequence number 324 from persistent memory 336, increment its value, and store it back into persistent memory.

Because the sequence number monotonically increases with each entry, the sequence number can uniquely identify the entry. Sequence numbers also indicate the relative ages of the queue entries. For example, a queue entry having a sequence number '21' is older or earlier in time than a queue entry having a sequence number '34'. In other words, the queue entry with sequence number '21' was pushed on the queue before the queue entry with sequence number '34' was pushed on the queue.

At operation 408, the writer process can enqueue the received data object. The computing device can pair the received data object with the generated sequence number to produce a 2-tuple entry (entry) that can then be enqueued or pushed onto the queue. In the network device use case, for example, the writer process 304 can invoke functionality in the queue manager 308a (e.g., via an application programming interface, API) to enqueue the entry onto queue 312.

At operation 410, the writer process can notify the reader processes in response to successfully enqueueing the entry. The notification signals the reader processes that an entry has been enqueued. In the network device use case, for example, the writer process 304 can send a notification 322 to the reader processes 306. Processing can return to decision point 402.

Figure 5:
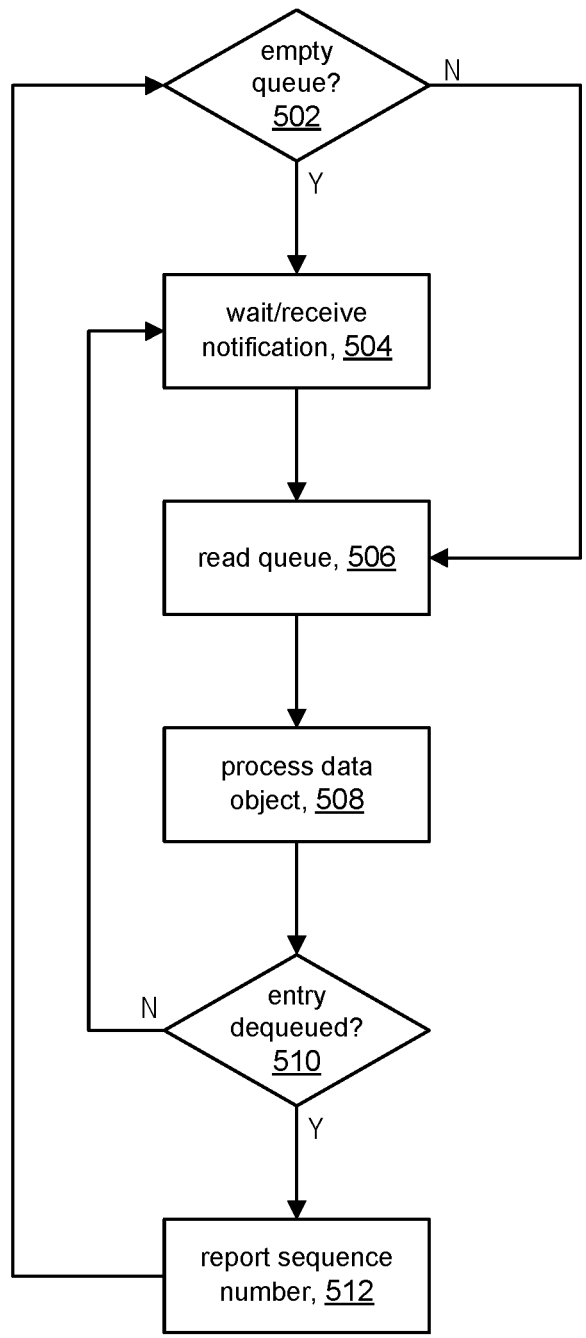
FIG. 5 is a representative flow of operations in a reader process in accordance with the present disclosure.

Referring to FIGS. 3 and 5, the discussion will now turn to a high-level description of processing in a computing device for dequeuing data on a shared memory queue 312 in accordance with the present disclosure. For discussion purposes, our illustrative example for a computing device is a network device, such as illustrated in FIG. 3. Processing in the network device is divided between the control plane (queue manager, writer process) and the data plane (reader processes). The network device can include one or more processing units (circuits), which when operated, can cause the network device to perform processing in accordance with FIG. 5. Processing units (circuits) in the control plane, for example, can include general CPUs that operate by way of executing computer program code stored on a non-volatile computer readable storage medium (e.g., read-only memory); e.g., CPU 208 in the control plane (FIG. 2) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 212a-212p in the data plane (FIG. 2) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At decision point 502, if the queue is empty, the reader process running on the computing device can proceed to operation 504. If the queue is not empty, then processing can continue to operation 506.

At operation 504, the reader process can wait for and receive a notification from a writer process running on the computing device (reference operation 410 in FIG. 4). In the network device use case, for example, each reader process 306 running on the network device can receive a notification 322 from the writer process 304. In some embodiments, for example, the writer process can notify the reader process via a suitable interprocess communication mechanism; e.g., listen on a socket. In other embodiments, the reader process can poll for a notification, and the like.

In accordance with the present disclosure, the reader process can dictate when it wants to be notified of a queued entry. In some embodiments, for example, the reader process can specify notification criteria to its corresponding queue manager (e.g., 308b), and the queue manager then follows the notification criteria. In some embodiments, for example, a reader process can request the writer process to communicate a notification after every $n^{th}$ entry enqueued by the writer process, where n can be ≥1. In some embodiments, the reader process can request to be notified only if the writer process enqueued an entry on an empty queue (no pending queue entries), and so on.

At operation 506, the reader process can read a queue entry from the queue. In the network device use case, for example, the reader process 306 can read the queue entry at the top of the queue 312 by performing a "peek" operation which reads the top of the queue but does not dequeue the entry at the top of the queue.

Alternatively, the reader process 306 can read the queue 312 by dequeuing (popping) the queue entry at the top of the queue. In accordance with the present disclosure, each reader process has its own view of the top of the queue because each reader process will consume queue entries at different speeds. In accordance with the present disclosure, when a queue entry is popped by a reader process, the queue itself remains unaffected; e.g., the queue entry is not deleted from the queue but remains in the queue because another reader process may not have reached that point in the queue. Instead, each reader process maintains its own pointer to the front of the queue.

At operation 508, the reader process can process the data object contained in the queue entry that was read (peeked or popped) at operation 506. The specific action(s) performed by the reader process depend on the nature of the data object. In the network device use case, for example, if the data object is a network route, then the reader process 306 can process the route by programming the route in a hardware table 336, or advertise the route to a neighbor device 34. In some embodiments, a reader process can do nothing if the queue entry was not relevant to the reader process and simply discard the entry.

At decision point 510, if the queue entry was read from the queue by peeking the queue, then the top of the queue remains unchanged and processing can continue at operation 504. Otherwise, processing can continue at operation 512.

At operation 512, the reader process can report to the writer process the (dequeued) sequence number associated with the dequeued entry. This lets the writer process know how far along the reader process is in the queue so the writer process can know when to age out queue entries to free up space in the queue. This aspect of the present disclosure is discussed in more detail below. In some embodiments, a reader process can report a dequeued sequence number each time the reader process dequeues an entry. However, this can result in flooding the writer process with too many sequence number messages, especially if there are many reader processes. Accordingly, in some embodiments the reader process may report one or two dequeued sequence numbers per unit of time. In some embodiments, a reader process may report a dequeued sequence number on every $n^{th}$ dequeue operation. The value for n can be set and adjusted in any suitable manner. In some embodiments, for example, the value for n can be a system parameter that applies to each reader process. In some embodiments, the value n can differ from one reader process to another. The reader process can vary the value for n over time, and so on. Processing can return to decision point 502.

Age Out Queue Entries

Referring to FIGS. 1 and 3, in accordance with the present disclosure, queue entries (112a, 312a) in the shared queue (112, 312) can be "aged out" in accordance with the present disclosure. When a queue entry is aged out, that means the memory used by the entry can be reused or otherwise reclaimed by the writer-side queue manager (e.g., 108a).

In accordance with the present disclosure, queue entries can be aged out by the writer when all the readers have explicitly indicated to the writer that they have consumed those entries from the queue. Each reader process consumes the queue at their own pace, and so the top (or front) of the queue will vary from one reader to another. As such, the writer cannot age out queue entries independently of the readers. Each reader process can report to the writer process the sequence number of the most recently dequeued entry (e.g., operation 512). The writer process can determine the earliest point in the queue by keeping track of the smallest sequence number among the reported sequence numbers; the smallest reported sequence number represents the earliest entry in the queue that was dequeued by all the readers. The writer process can age out all queue entries having sequence numbers equal to or less than the smallest reported sequence number. In some embodiments, the writer process can age out queue entries based on a value computed from the reported sequence numbers; e.g., computing an average of the reported sequence numbers.

Pending queue entries are not aged out; i.e., memory is still allocated to the pending entry. This is significant, because the maxSize parameter applies to pending queue entries to determine whether new entries can be enqueued. It is the process of ageing out entries that are no longer pending that reduces the number of pending entries in the queue. In accordance with the present disclosure, a queue entry is deemed to be no longer pending when the writer process learns that all the reader processes have dequeued an entry.

As explained above, the writer process learns that a given queue entry can be deemed no longer pending when the sequence number of the given queue entry is less than the lastConsumedSeqNo values reported by all the reader processes. Conversely, a queue entry can be deemed to be still pending by the writer process when a queue entry has not been accessed (peek'd or popped) by any reader process or when the queue entry has only been peek'd by reader processes, because peeking a queue entry does not consume the entry. A queue entry can be deemed to be pending by the writer process when that queue entry has been dequeued by only some of the reader processes. A queue entry can be deemed pending by the writer process when the queue entry has been dequeued by all the readers, but not all the reader processes have reported a lastConsumedSeqNo value that includes the sequence number of the dequeued queue entry to the writer process.

Illustrative Sequence of Queue Operations

Referring to FIGS. 6A-6G, aspects of the present disclosure will be illustrated by an example. The figures show snapshots of a writer process (writer) 602 and a reader process (reader) 604, and a shared queue (queue) 606 at various stages of accessing the queue in accordance with the present disclosure.

The writer includes a lastConsumedSeqNo parameter and a maxSize parameter. The lastConsumedSeqNo parameter represents the lowest value sequence number reported by the reader processes. The maxSize parameter represents the maximum number of allowed pending queue entries that the writer wants in the queue. The queue includes a maxSize parameter that limits (e.g., via a queue manager 108*a*, FIG. 1) the number of pending queue entries 608 in the queue. In some embodiments, the maxSize parameter in the queue can be set by the writer.

The reader includes a frontOfQueue pointer and a lastConsumedSeqNo parameter. The lastConsumedSeqNo parameter represents the sequence number of the last queue entry consumed (popped, dequeued) by the reader. The frontOfQueue parameter points to the front of the queue. In accordance with the present disclosure, each reader can peek and pop the queue independently of any other reader. Accordingly, each reader has its own view of the queue and its own notion of where the front of the queue is. The frontOfQueue pointer and the lastConsumedSeqNo parameter in one reader is independent of the frontOfQueue pointer and lastConsumedSeqNo parameter in another reader.

Figure 6A:
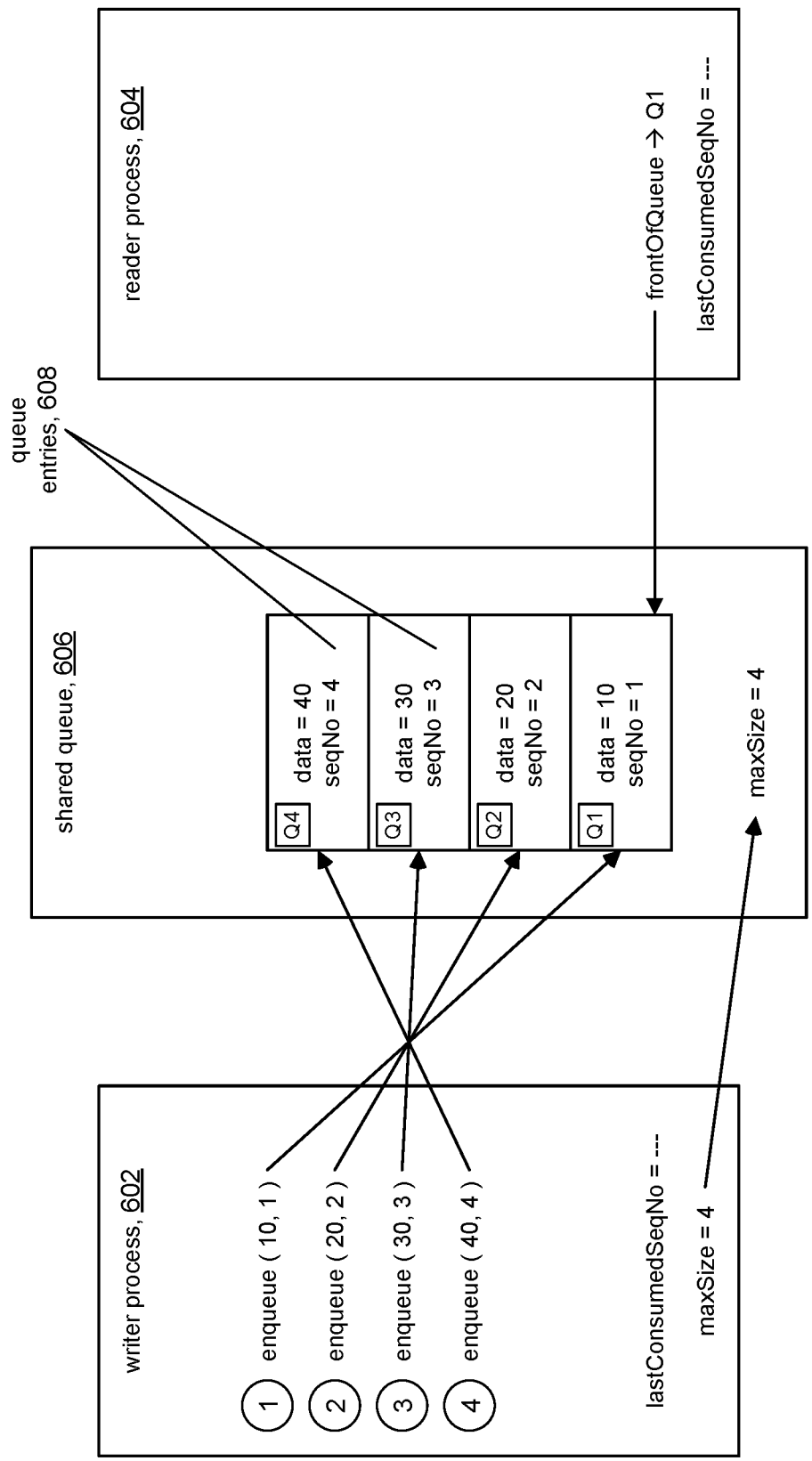
FIGS. 6A-6G are snapshots of a series of operations on a shared queue in accordance with the present disclosure.

The snapshot in FIG. 6A shows an initial configuration, where the writer has set the maxSize parameter to '4'. The writer has enqueued four entries onto the queue in the order indicated by the time indices (represented by the circled numbers). Time index 1, for example, represents that the writer had received a data object "10" from a data source and enqueued an entry (Q1) comprising the data object and a sequence number '1'. At time index 2, another data object is received and another entry (Q2) is enqueued, this time with the sequence number incremented to '2', and so on.

The snapshot shows that the reader has not yet accessed the queue. As such, the reader's notion of the top of the queue is queue entry Q1 (to which the frontOfQueue pointer points). The lastConsumedSeqNo parameter is cleared (not set) because the reader has not dequeued any entry.

Figure 6B:
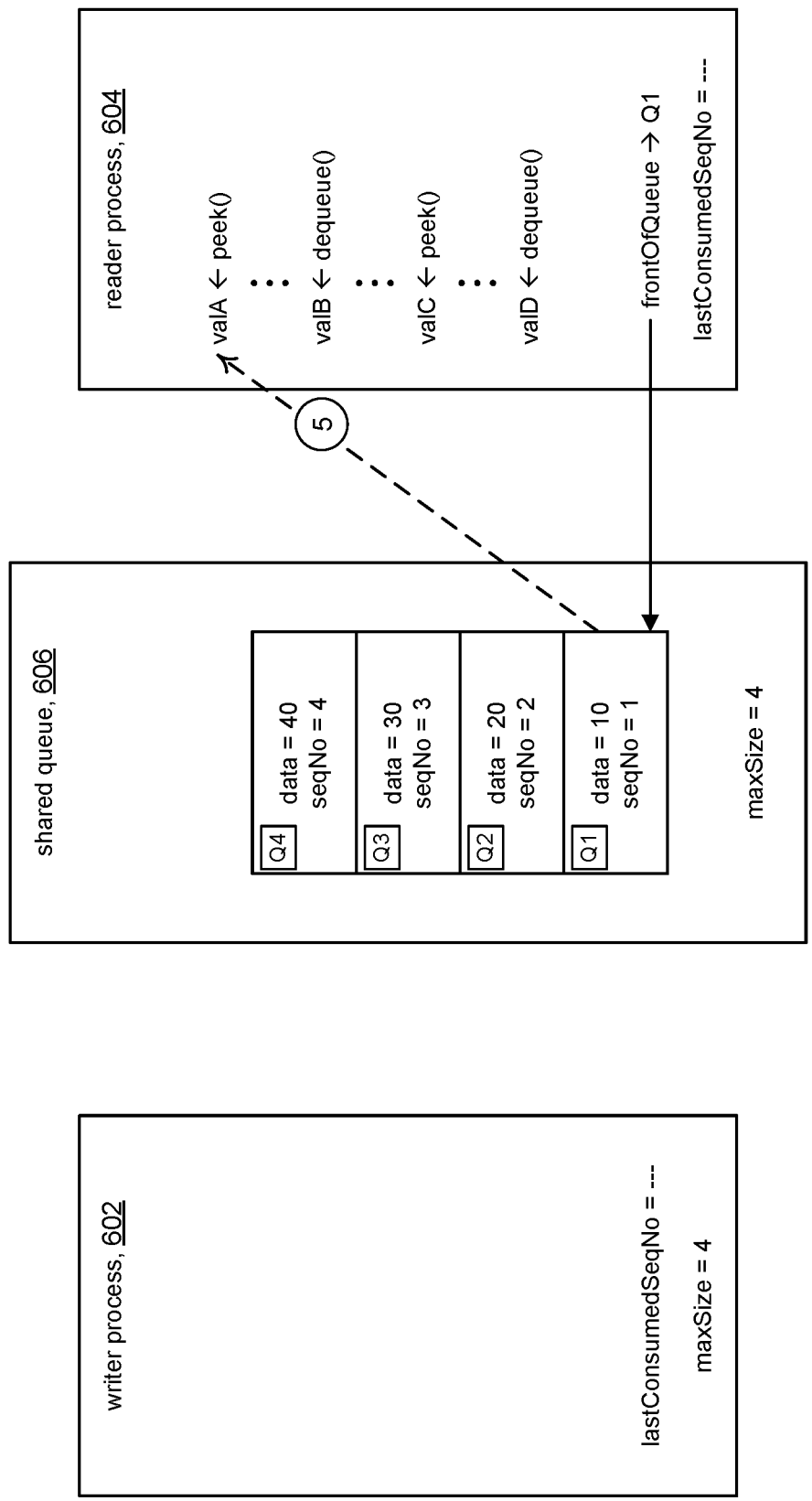

FIGS. 6B-6E show a sequence of queue accesses by the reader:

FIG. 6B—This snapshot shows the reader peek'ing the top of the queue (time index 5), which at this time is entry Q1. As such, the peek operation sets valA to the data object in entry Q1, namely "10". The frontOfQueue pointer remains at entry Q1 because a peek operation reads the top of the queue but does not dequeue the entry. The reader's lastConsumedSeqNo parameter is unchanged because the queue entry was not dequeued.

Figure 6C:
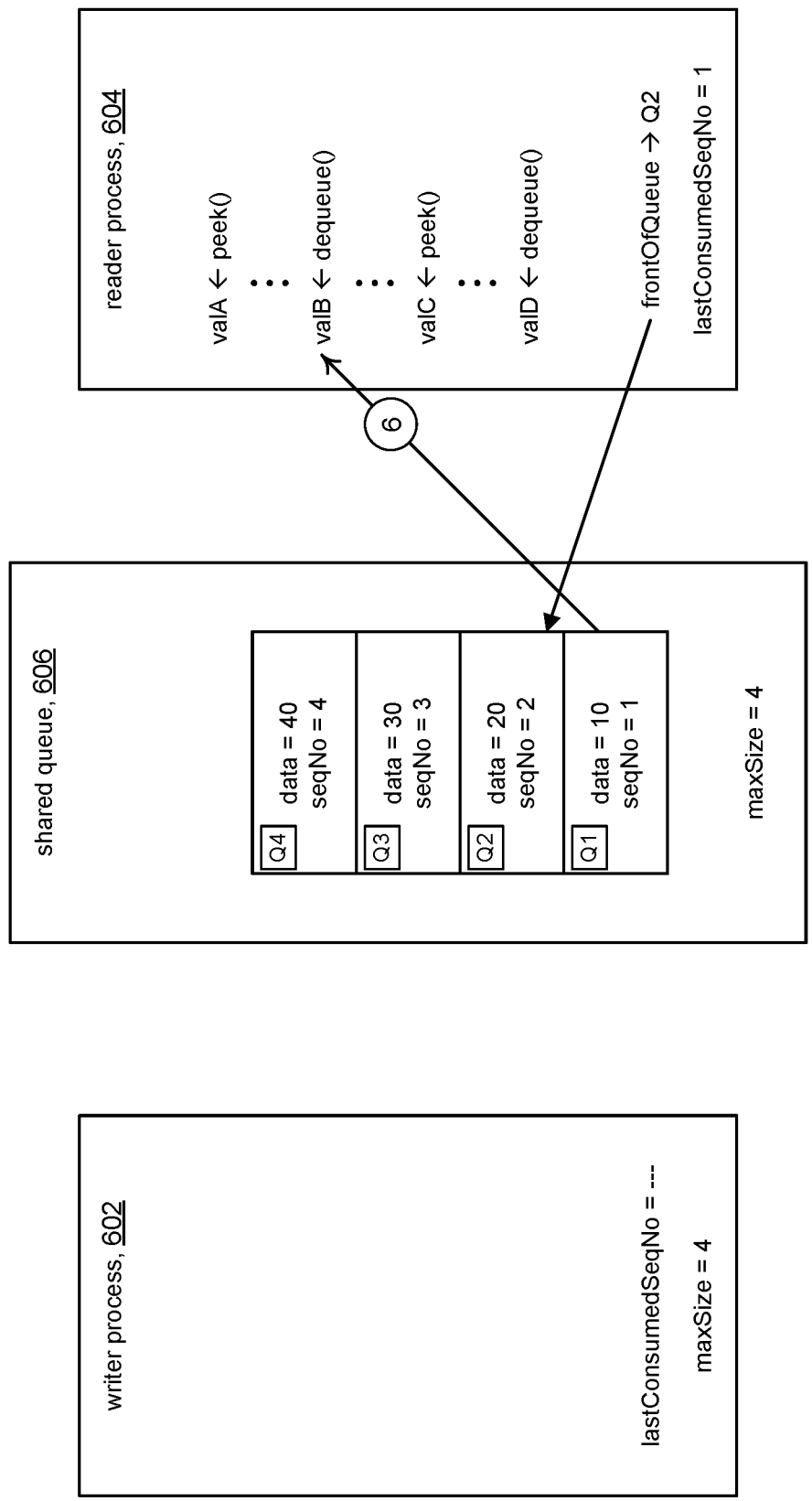

FIG. 6C—This snapshot shows the reader dequeuing (popping, consuming) entry Q1 from the queue (time index 6). The dequeue operation sets valB to the data object in entry Q1, namely "10". The reader's lastConsumedSeqNo parameter is set to the sequence number associated with dequeued entry Q1, namely sequence number '1'. The frontOfQueue pointer points to the next entry in the queue, namely entry Q2. As discussed above, in some embodiments the reader can report the dequeued sequence number to the writer on each dequeue operation. In some embodiments, to reduce processor loading, the reader may report to the writer once or twice per unit of time. For discussion purposes, suppose the reader does not report the dequeued sequence number for entry Q1 at this time.

Figure 6D:
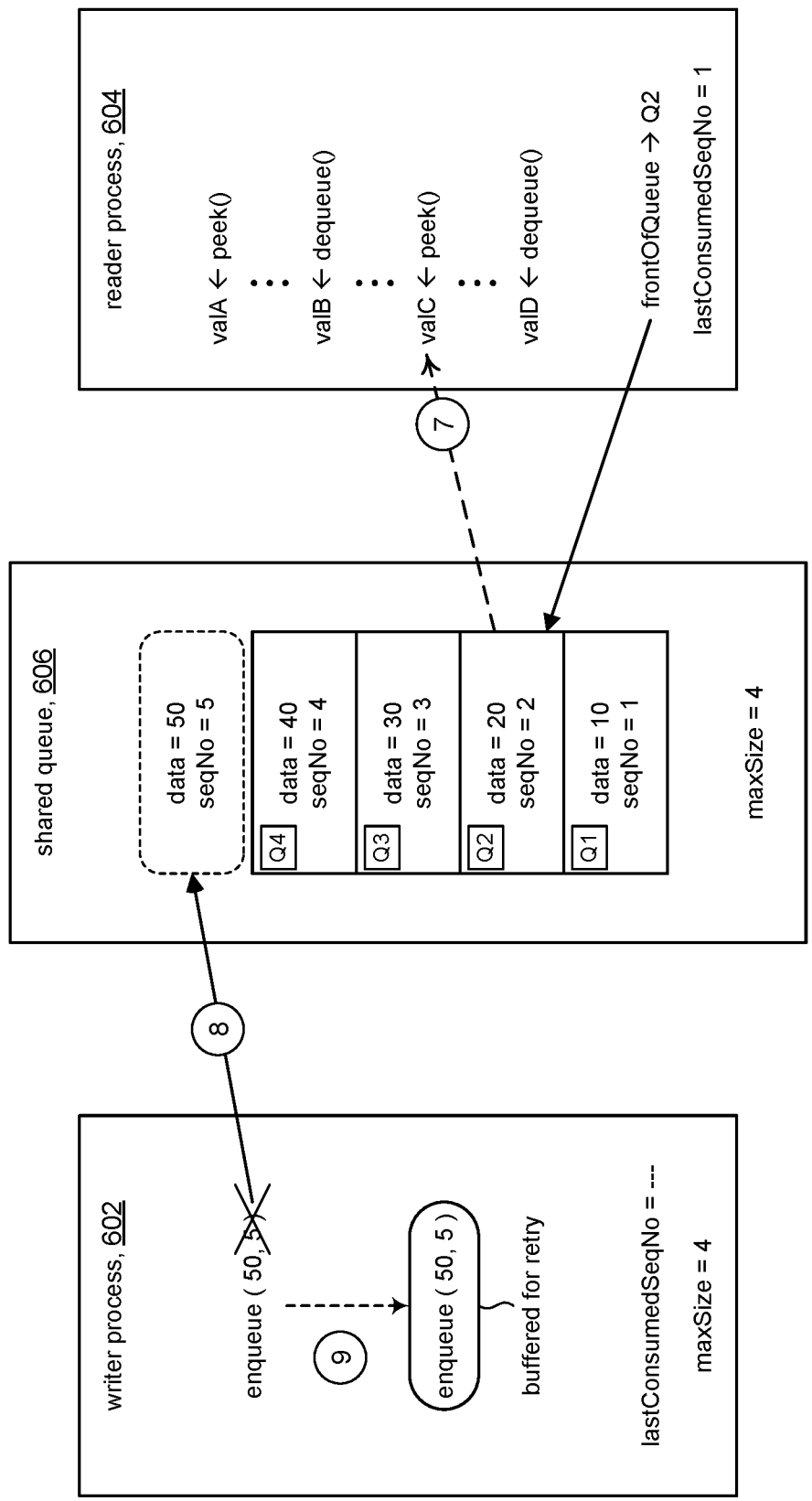

FIG. 6D—This snapshot shows the reader peek'ing the top of the queue (time index 7), which is now entry Q2. As such, the peek operation sets valC to the data object in entry Q2, namely "20". The frontOfQueue pointer remains at entry Q2 because the operation is a peek operation and not a dequeue operation. The reader's lastConsumedSeqNo parameter is unchanged because the queue entry was not dequeued.

Time index 8 represents the writer having received a data object "50" from a data source and makes a call to enqueue an entry comprising the data object and a sequence number '5'. However, the call fails because the number of pending queue entries is at the current setting of maxSize in the queue. This figure illustrates the discussion of ageing out pending entries described above. Although entry Q1 has been consumed by the reader, it is nonetheless counted as a pending entry because the writer has not yet been informed by the reader (e.g., via lastConsumedSeqNo) that it has been consumed, and so the writer will not age out Q1. FIG. 6D further shows that in some embodiments, the data object, at time index 9, can be buffered for a subsequent retry.

Figure 6E:
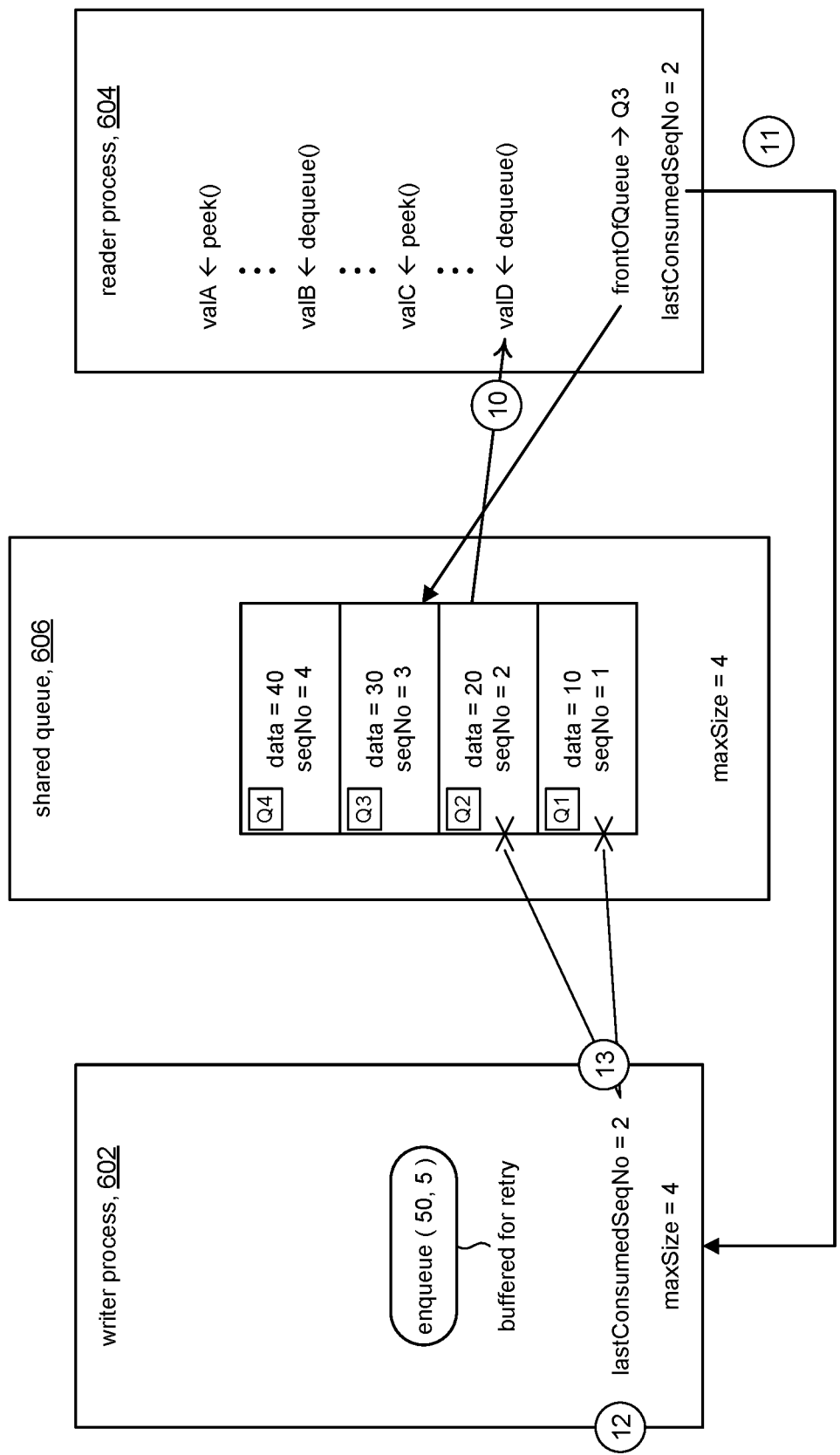

FIG. 6E—This snapshot shows the reader dequeuing entry Q2 from the queue (time index 10). The dequeue operation sets valD to the data object in entry Q2, namely "20". The reader's lastConsumedSeqNo parameter is set to the sequence number associated with consumed entry Q2, namely sequence number '2'. The frontOfQueue pointer points to the next entry in the queue, namely entry Q3. Suppose at time index 11, the reader reports the dequeued sequence number to the writer.

At time index 12, in response to receiving the reported sequence number, the writer sets its lastConsumedSeqNo parameter to '2'. Subsequently, at time index 13, the writer ages out queue entries that have a sequence number less than or equal to the writer's lastConsumedSeqNo parameter, namely Q1 and Q2, resulting in two pending entries in the queue. It is noted that the assumption is that all readers (in this case there is one reader) are assumed to have dequeued Q1 and Q2 and have reported a lastConsumedSeqNo of 2 to the writer.

Figure 6F:
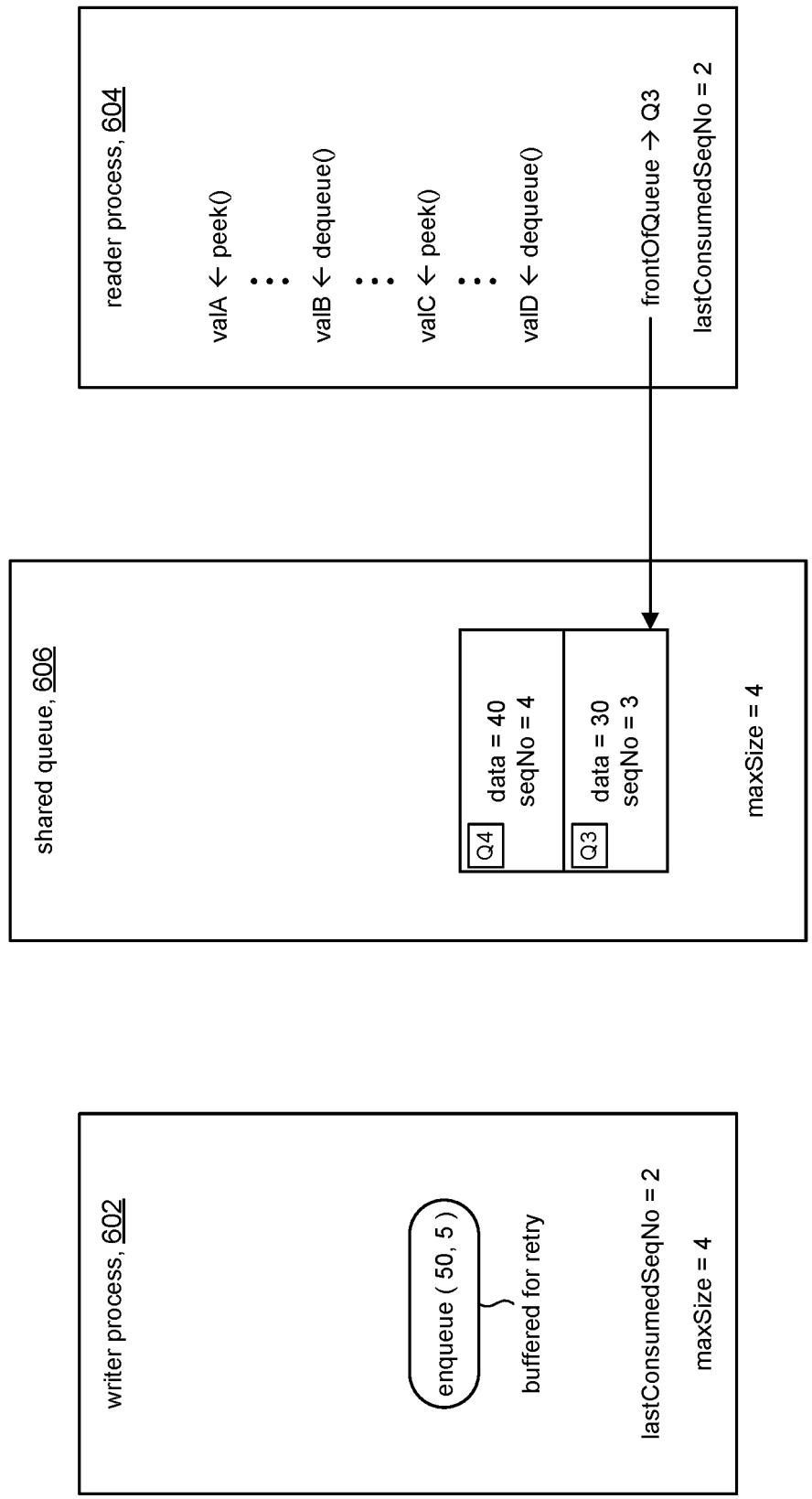

FIG. 6F shows the state of the queue after aging out the queue entries Q1 and Q2.

Figure 6G:
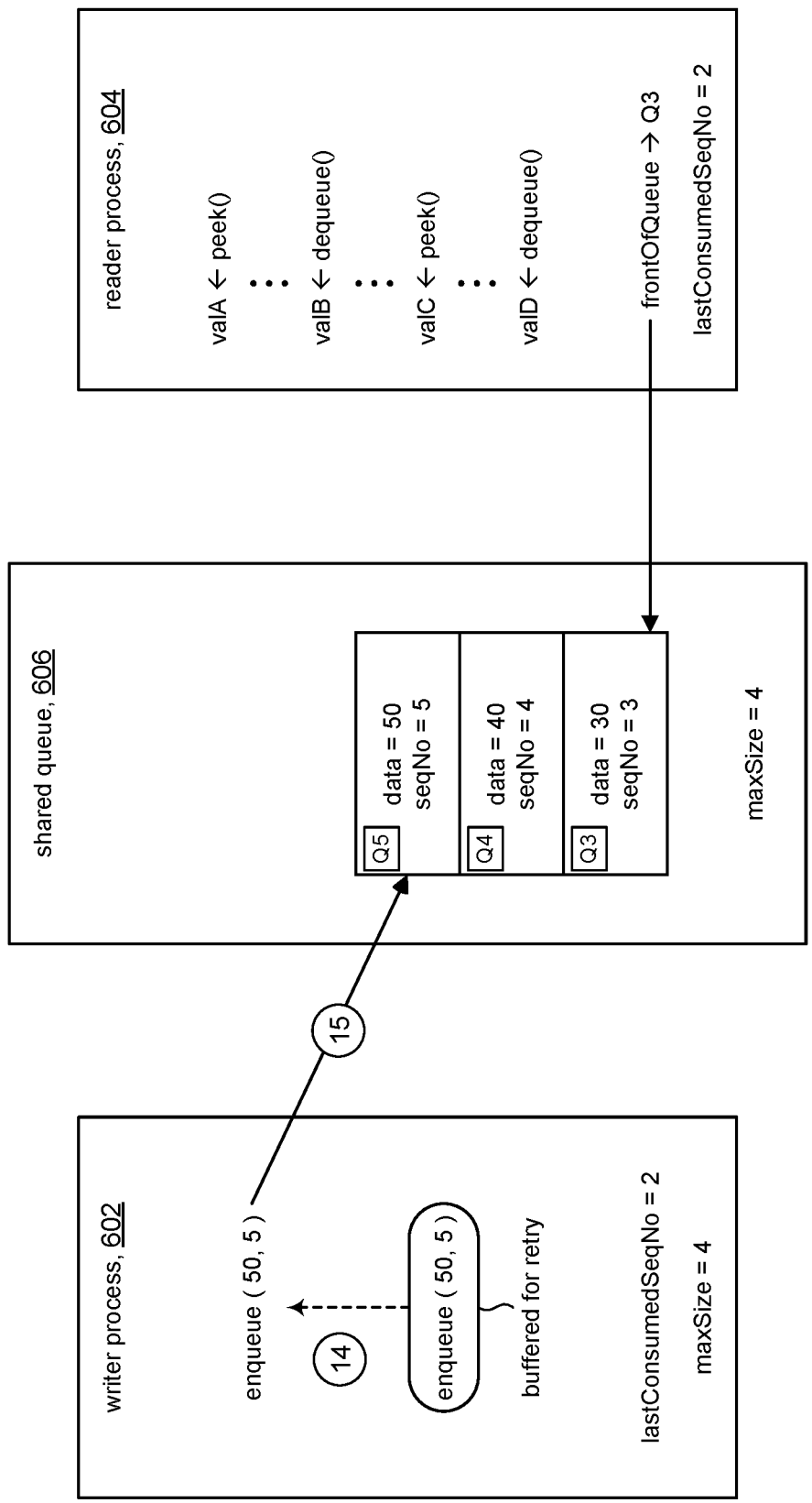

FIG. 6G, shows, subsequent to aging out queue entries Q1 and Q2, the writer making a call to enqueue any buffered entries it may have, which in our example there is one. Accordingly, at time index 14, the writer makes a call to enqueue the entry, and because the number of pending entries in the queue is smaller than the queue's maxSize parameter, the entry is enqueued at time index 15.

The foregoing sequence illustrates various aspects of the present disclosure. For example, the writer process ages out queue entries in response to reports from the reader processes who access the queue, which in turn are made based on their own progress through the queue. Queue entries are aged out by the writer only when the readers report that they have dequeued the entries. When the queue is full, the writer will take appropriate action regarding new entries such as buffering the entry, reporting back to the data source, etc.

FURTHER EXAMPLES

Features described above as well as those claimed below may be combined in various ways without departing from the scope hereof. The following examples illustrate some possible, non-limiting combinations:

(A1) A method in a computing device to manage access to a shared memory data structure, the method comprising: a writer process, running on the computing device, enqueueing entries comprising received data objects on the shared memory data structure; the writer process, subsequent to enqueueing one or more entries on the shared memory data structure, notifying at least one reader process running on the computing device to inform the reader process of newly enqueued entries in the shared memory data structure; the reader process, subsequent to being notified, dequeuing a first entry from the shared memory data structure; the reader process, subsequent to dequeuing the first entry from the shared memory data structure, notifying the writer process that the first entry was dequeued; and the writer process, subsequent to being notified by the reader process, ageing out one or more entries in the shared memory data structure, wherein memory allocated to aged out entries is reused.

(A2) For the method denoted as (A1), each entry in the shared memory data structure comprises a received data object and a sequence number that monotonically increases from one entry to the next entry, wherein the reader process notifying the writer process includes the reader process informing the writer process with a sequence number associated with a latest dequeued entry, wherein the writer process ages out entries in the shared memory data structure based on the sequence number.

(A3) For the method denoted as any of (A1) through (A2), the writer process ages out entries in the shared memory data structure based on a value determined from a plurality of sequence numbers received from a respective plurality of reader processes.

(A4) The method denoted as any of (A1) through (A3), further comprising the reader process specifying criteria for when to be notified of a newly enqueued entry.

(A5) For the method denoted as any of (A1) through (A4), the writer process sets a maximum number of entries that can be enqueued in the shared memory data structure.

(A6) The method denoted as any of (A1) through (A5), further comprising the writer process receiving a plurality of maxSize values from a respective plurality of reader processes, wherein each maxSize value represents a maximum number of entries that can be enqueued in the shared memory data structure, wherein the writer process sets the maximum number of entries to a value that is determined from the plurality of maxSize values.

(A7) For the method denoted as any of (A1) through (A6), dequeuing entries from the shared memory data structure includes advancing a front-of-queue indicator that points to the next entry to be dequeued, the method further comprising the reader process reading an entry pointed to by the front-of-queue indicator without advancing the front-of-queue indicator.

(A8) For the method denoted as any of (A1) through (A7), the reader process dequeues the first entry from the shared memory data structure in first-in-first-out order.

(A9) For the method denoted as any of (A1) through (A8), the computing device is a network device, wherein the data objects include routing information, wherein the reader process programs a hardware table in the network device with information based on routing information contained in data objects dequeued by the reader process.

(B1) A computing device comprising: one or more computer processors; a memory device; and a computer-readable storage device comprising instructions for controlling the one or more computer processors to instantiate a first process and at least one second process to run on the one or more computer processors, the first and second processes having shared access to a data queue implemented in the memory device, wherein the first process enqueues entries comprising received data objects onto the data queue, wherein the second process dequeues previously enqueued entries from the data queue, wherein the second process reports to the first process an identity of a previously dequeued entry, and wherein the first process ages out one or more entries in the data queue based on the identity of a previously dequeued entry reported by the second process, wherein aged out entries in the data queue are subsequently deleted.

(B2) For the computing device denoted as (B1), entries in the data queue are identified by a sequence number that is incremented with each successive entry that is enqueued onto the data queue, wherein the first process ages out entries in the data queue whose sequence numbers are less than or equal to a sequence number of the previously dequeued entry reported by the second process.

(B3) For the computing device denoted as any of (B1) through (B2), entries in the data queue are identified by a sequence number that is incremented with each successive entry that is enqueued onto the data queue, wherein the first process receives a plurality of sequence numbers that identify entries dequeued by a plurality of respective second processes, wherein the first process ages out entries in the data queue based on the smallest value among the received plurality of sequence numbers.

(B4) For the computing device denoted as any of (B1) through (B3), the first process sends a notification to signal that an entry has been enqueued onto the data queue.

(B5) For the computing device denoted as any of (B1) through (B4), the second process specifies criteria for when to be notified that an entry has been enqueued onto the data queue.

(B6) For the computing device denoted as any of (B1) through (B5), the first process sets a maximum number of entries that can be enqueued in the data queue.

(C1) A non-transitory computer-readable storage device in a computing device, the non-transitory computer-readable storage device having stored thereon computer executable instructions, which when executed, cause the computing device to instantiate a first process and at least one second process to run on the one or more computer processors, the first and second processes having shared access to a data queue implemented in the memory device, wherein the first process enqueues entries comprising received data objects onto the data queue, wherein the second process dequeues previously enqueued entries from the data queue, wherein the second process reports to the first process an identity of a previously dequeued entry, and wherein the first process ages out one or more entries in the data queue based on the identity of a previously dequeued entry reported by the second process.

(C2) For the non-transitory computer-readable storage device denoted as (C1), entries in the data queue are identified by a sequence number that is incremented with each successive entry that is enqueued onto the data queue, wherein the first process receives a plurality of sequence numbers that identify entries dequeued by a plurality of respective second processes, wherein the first process ages out entries in the data queue based on the smallest value among the received plurality of sequence numbers.

(C3) For the non-transitory computer-readable storage device denoted as any of (C1) through (C2), the first process sends a notification to the second process in response to enqueueing entries onto the data queue to signal the second process that an entry has been enqueued onto the data queue.

(C4) For the non-transitory computer-readable storage device denoted as any of (C1) through (C3), the second process specifies criteria for when to be notified that an entry has been enqueued onto the data queue.

(C5) For the non-transitory computer-readable storage device denoted as any of (C1) through (C4), the first process sets a maximum number of entries that can be enqueued in the data queue.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a computing device to manage access to a shared memory data structure, the method comprising:
   a writer process, running on the computing device, enqueueing entries comprising received data objects on the shared memory data structure;
   the writer process, subsequent to enqueueing one or more entries on the shared memory data structure, notifying at least one reader process running on the computing device to inform the reader process of newly enqueued entries in the shared memory data structure;
   the reader process, subsequent to being notified, dequeuing a first entry from the shared memory data structure;
   the reader process, subsequent to dequeuing the first entry from the shared memory data structure, notifying the writer process that the first entry was dequeued; and
   the writer process, subsequent to being notified by the reader process, ageing out one or more entries in the shared memory data structure, wherein memory allocated to aged out entries is reused.

2. The method of claim 1, wherein each entry in the shared memory data structure comprises a received data object and a sequence number that monotonically increases from one entry to the next entry, wherein the reader process notifying the writer process includes the reader process informing the writer process with a sequence number associated with a latest dequeued entry, wherein the writer process ages out entries in the shared memory data structure based on the sequence number.

3. The method of claim 2, wherein the writer process ages out entries in the shared memory data structure based on a value determined from a plurality of sequence numbers received from a respective plurality of reader processes.

4. The method of claim 1, further comprising the reader process specifying criteria for when to be notified of a newly enqueued entry.

5. The method of claim 1, wherein the writer process sets a maximum number of entries that can be enqueued in the shared memory data structure.

6. The method of claim 5, further comprising the writer process receiving a plurality of maxSize values from a respective plurality of reader processes, wherein each maxSize value represents a maximum number of entries that can be enqueued in the shared memory data structure, wherein the writer process sets the maximum number of entries to a value that is determined from the plurality of maxSize values.

7. The method of claim 1, wherein dequeuing entries from the shared memory data structure includes advancing a front-of-queue indicator that points to the next entry to be dequeued, the method further comprising the reader process reading an entry pointed to by the front-of-queue indicator without advancing the front-of-queue indicator.

8. The method of claim 1, wherein the reader process dequeues the first entry from the shared memory data structure in first-in-first-out order.

9. The method of claim 1, wherein the computing device is a network device, wherein the data objects include routing information, wherein the reader process programs a hardware table in the network device with information based on routing information contained in data objects dequeued by the reader process.

10. A computing device comprising:
    one or more computer processors;
    a memory device; and
    a non-transitory computer-readable storage medium having stored thereon instructions for controlling the one or more computer processors to instantiate a first process and at least one second process to run on the one or more computer processors, the first and second processes having shared access to a data queue implemented in the memory device,
    wherein the first process enqueues entries comprising received data objects onto the data queue,
    wherein the second process dequeues previously enqueued entries from the data queue,
    wherein the second process reports to the first process an identity of a first dequeued entry, and
    wherein the first process ages out one or more entries in the data queue based on the identity of the first dequeued entry reported by the second process, wherein the aged out one or more entries in the data queue are subsequently deleted.

11. The computing device of claim 10, wherein entries in the data queue are identified by a sequence number that is incremented with each successive entry that is enqueued onto the data queue, wherein the first process ages out entries in the data queue whose sequence numbers are less than or equal to a sequence number of the first dequeued entry reported by the second process.

12. The computing device of claim 10, wherein entries in the data queue are identified by a sequence number that is incremented with each successive entry that is enqueued onto the data queue, wherein the first process receives a plurality of sequence numbers that identify entries dequeued by a plurality of respective second processes, wherein the first process ages out entries in the data queue based on the smallest value among the received plurality of sequence numbers.

13. The computing device of claim 10, wherein the first process sends a notification to signal that an entry has been enqueued onto the data queue.

14. The computing device of claim 13, wherein the second process specifies criteria for when to be notified that an entry has been enqueued onto the data queue.

15. The computing device of claim 10, wherein the first process sets a maximum number of entries that can be enqueued in the data queue.

16. A non-transitory computer-readable storage device in a computing device, the non-transitory computer-readable storage device having stored thereon computer executable instructions, which when executed, cause the computing device to instantiate a first process and at least one second process to run on one or more computer processors, the first and second processes having shared access to a data queue implemented in the computer-readable storage device,
wherein the first process enqueues entries comprising received data objects onto the data queue,
wherein the second process dequeues previously enqueued entries from the data queue,
wherein the second process reports to the first process an identity of a first dequeued entry, and
wherein the first process ages out one or more entries in the data queue based on the identity of the first dequeued entry reported by the second process.

17. The non-transitory computer-readable storage device of claim 16, wherein entries in the data queue are identified by a sequence number that is incremented with each successive entry that is enqueued onto the data queue, wherein the first process receives a plurality of sequence numbers that identify entries dequeued by a plurality of respective second processes, wherein the first process ages out entries in the data queue based on the smallest value among the received plurality of sequence numbers.

18. The non-transitory computer-readable storage device of claim 16, wherein the first process sends a notification to the second process in response to enqueueing entries onto the data queue to signal the second process that an entry has been enqueued onto the data queue.

19. The non-transitory computer-readable storage device of claim 18, wherein the second process specifies criteria for when to be notified that an entry has been enqueued onto the data queue.

20. The non-transitory computer-readable storage device of claim 16, wherein the first process sets a maximum number of entries that can be enqueued in the data queue.

* * * * *